(12) United States Patent
Meyerzon et al.

(10) Patent No.: US 6,199,081 B1
(45) Date of Patent: Mar. 6, 2001

(54) AUTOMATIC TAGGING OF DOCUMENTS AND EXCLUSION BY CONTENT

(75) Inventors: Dmitriy Meyerzon, Bellevue; William G. Nichols, Seattle, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/107,225

(22) Filed: Jun. 30, 1998

(51) Int. Cl.⁷ .................................................... G06F 17/21
(52) U.S. Cl. ........................ 707/513; 707/516; 707/530; 707/6
(58) Field of Search .................................. 707/512, 513, 707/1, 3, 5, 10, 6, 516, 530; 345/335; 709/217–219, 201–203

(56) References Cited

U.S. PATENT DOCUMENTS

| | | | |
|---|---|---|---|
| 5,659,732 | 8/1997 | Kirsch | 707/10 |
| 5,748,954 | 5/1998 | Mauldin | 707/5 |
| 5,835,722 * | 11/1998 | Bradshaw et al. | 395/200.55 |
| 5,855,020 * | 12/1998 | Kirsch et al. | 707/10 |
| 5,864,871 * | 1/1999 | Kitain et al. | 707/104 |
| 5,867,799 * | 2/1999 | Lang et al. | 707/1 |
| 5,870,559 * | 2/1999 | Leshem et al. | 395/200.54 |
| 5,875,446 * | 2/1999 | Brown et al. | 707/3 |
| 5,899,999 * | 5/1999 | De Bonet | 707/104 |
| 5,933,822 * | 8/1999 | Braden-Harder et al. | 707/5 |
| 5,974,412 * | 10/1999 | Hazlehurst et al. | 707/3 |
| 5,983,214 * | 11/1999 | Lang et al. | 707/1 |
| 5,999,940 * | 12/1999 | Ranger | 707/103 |
| 6,029,161 * | 2/2000 | Lang et al. | 707/1 |
| 6,094,657 * | 7/2000 | Hailpern et al. | 707/103 |

OTHER PUBLICATIONS

Gralla, Preston, How the Internet Workd, Special Edition, Ziff–Davis Press, pp. 248–251, Dec. 1997.*
Oliver, Dick, et al, Netscape 3 Unleashed, second edition, Sams.net Publishing, pp. 92–97, 491, Dec. 1996.*

* cited by examiner

Primary Examiner—Joseph H. Feild
(74) Attorney, Agent, or Firm—Christensen O'Connor Johnson Kindness PLLC

(57) ABSTRACT

A computer-based method and system for processing data obtained from documents retrieved from a computer network during a gathering project is disclosed. Plugging in modular active and consumer plug-ins into the gathering project configures the information processing capability of the gathering process that retrieves the documents. The gathering process retrieves a copy of an electronic document from a server connected to the computer network and returns a document data stream that includes the retrieved document's data and its "properties." One or more active plug-ins plugged-in to the gathering process is used to add, delete or modify the properties in the document data stream based on the document's contents or properties. The modified document data stream is then passed to one or more consumer plug-ins that use the properties in the modified document data stream to process the document in some manner. An active plug-in can prevent any part of the document data stream from being forwarded to subsequent active or consumer plug-ins in the project. An active plug-in can also control the consumer plug-ins by instructing them to abort processing of a particular document after analyzing some of the document's contents while the document is being processed.

49 Claims, 8 Drawing Sheets

AUTOMATIC TAGGING OF DOCUMENTS AND EXCLUSION BY CONTENT

FIELD OF THE INVENTION

The present invention relates to the field of software and, in particular, to methods and systems for retrieving data from network sites and processing that data according to its content.

BACKGROUND OF THE INVENTION

In recent years, there has been a tremendous proliferation of computers connected to a global network known as the Internet. A "client" computer connected to the Internet can download digital information from "server" computers connected to the Internet. Client application software executing on client computers typically accepts commands from a user and obtains data and services by sending requests to server applications running on server computers connected to the Internet. A number of protocols are used to exchange commands and data between computers connected to the Internet. The protocols include the File Transfer Protocol (FTP), the Hypertext Transfer Protocol (HTTP), the Simple ail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites around the world that maintain and distribute Web documents. A Web site may use one or more Web server computers that store and distribute documents in one of a number of formats including the Hypertext Markup Language (HTML).

A HTML document contains text and tags. HTML documents may also contain metadata and metatags. Metadata is data about data and metatags define the meta-data. Examples of metatags that identify meta-data are "author," "language," and "character set." HTML documents may also include tags that contain embedded "links" or "hyperlinks" that reference other data or documents located on the same or another Web server computer. The HTML documents and the document referenced in the hyperlinks may include text, graphics, audio, or video in various formats.

A Web browser is a client application that communicates with server computers via HTTP, FTP, and Gopher protocols. Web browsers receive Web documents from the network and present them to a user. Internet Explorer, available from Microsoft Corporation, Redmond, Wash., is an example of a popular Web browser application.

An intranet is a local area network containing Web servers and client computers operating in a manner similar to that of the World Wide Web described above. Typically, all of the computers on an intranet are contained within a company or organization.

Web crawlers are computer programs that automatically retrieve numerous Web documents from one or more Web sites. A Web crawler processes the received data, preparing the data to be subsequently processed by other programs. For example, a Web crawler may use the retrieved data to create an index of documents available over the Internet or an intranet. A "search engine" can later use the index to locate Web documents that satisfy a specified search criteria.

It is desirable to have a mechanism in the crawler that allows the crawler to feed to client applications, like an indexing engine, a stream of data not directly present in the "crawled" documents. Preferably, such a mechanism would have the ability to modify data retrieved from Web documents with active components in order to allow the retrieved data to be processed more efficiently and accurately by the client application. The mechanism of the invention would also preferably have the ability to exclude a document from being indexed based on its content and properties. The present invention is directed to providing such a mechanism.

SUMMARY OF THE INVENTION

The present invention discloses a method and system for modifying a document data stream obtained by a gatherer process when an electronic document is retrieved from a computer. The gatherer process retrieves Web documents from Web servers that are connected to a computer network commonly known as the Word Wide Web. Preferably, the Web crawler employs a filtering process to retrieve the document and to parse the document into a document data stream comprising contents and properties. For instance, when an HTML document is retrieved, the filtering process converts the document's text and tags to a uniform representation of the document's contents and properties. The document retrieval performed by the present invention is not limited to HTML documents. Many different document formats may be filtered to produce a uniform representation of contents and properties that are processed by the invention in the manner described below.

In accordance with the present invention, the retrieved contents and properties of a document are contained in a document data stream that is sequentially piped through one or more active plug-in components. The active plug-in components modify the document data stream by adding, deleting, or modifying the contents and properties of the document data stream. Active plug-ins are modeled in the invention as modular components, or "plug-ins," that in an actual embodiment of the invention are software objects that can be plugged-in to a configuration entity called a gathering project. After the document data stream has been modified by the active plug-ins, the modified document's data stream is piped to one or more consumer plug-ins. A consumer plug-in is an application that processes the modified document data stream. The processing conducted by the consumer plug-in may be influenced by the modifications made to the original document data stream by the active plug-ins.

Both active plug-ins and consumer plug-ins can be mixed and matched and plugged-in to the gathering project according to the goals of the project. Active plug-ins are inserted before any consumer plug-ins so that they may modify the original document data stream in a way that makes the document data stream more useful to the consumer plug-ins that follow the active plug-in in the gathering project. The gathering project can also be configured not to use any active plug-ins, in which case all data contained in the original document data stream will be piped directly to the consumer plug-ins that are plugged-in to the project.

In accordance with other aspects of this invention, the gatherer process is an enhanced Web crawler that has one or more configuration entities called gathering projects. Each gathering project has its own transaction log, history map, plug-in list, and crawl restriction rules that the gatherer process uses to "crawl" Web documents that are stored on a plurality of Web servers connected to the World Wide Web. When the gatherer process retrieves a document, the gatherer process receives a copy of the content of the document, which may include data such as text, images, sound, and embedded properties.

An example of a client application that makes use of embedded properties is a Web browser that reads HTML tags embedded in a Web document to format the document and to specify hyperlinks to other Web documents. In addition to tags that provide formatting information, the document may also contain meta-tags, which are used to define meta-data in the document. For instance, a meta-tag "Author" may identify meta-data in the document that identifies the author of the document. Tags may either conform to "markup languages" such as HTML, SGML, XML and VRML, which are widely known to those skilled in the art, or tags can be defined as "extensions" to a markup language and embedded in documents for the use of specific client applications. An example of a client application that recognizes an extended set of property definitions is the Internet Explorer, a Web browser available from Microsoft Corporation, Redmond, Wash.

When the gatherer process retrieves a Web document, it first uses a filtering process to retrieve the Web document according to the appropriate protocol. The filter process then converts the text and tags retrieved from the document into a uniform representation of the document's contents and properties. The filtering process can return contents and properties from many other document formats other than HTML, such as Microsoft Word documents, email messages, and SQL database records. The filtering process strips out any extra information stored in the document that does not belong to its contents or properties. For instance, the filtering process discards tags that include formatting information such as paragraphs, fonts, styles, etc., that are used by the Web browser to render and display the document to a user.

After filtering, the gatherer process pipes the document's contents and properties in a document data stream to the plug-ins listed in the gathering project's plug-ins list. The filtered document data stream consists of a series of "chunks" that contain either content or properties. Unless explicitly stated otherwise, reference made to either content or properties herein will be understood to imply the other (i.e., a reference to properties implicitly also refers to content).

The gatherer process iterates through a list of one or more active plug-ins that it sequentially pipes the document data stream through. Each active plug-in has the capability to modify the document data stream by, for instance, deleting properties from the document data stream, inserting properties into the document data stream, deleting properties from the document data stream, or modifying properties in the document data stream. Because each active plug-in receives the document data stream as it has been modified by a previous active plug-in in the list, the modifications made by the active plug-ins are cumulative. Thus, the processing by the active plug-ins may themselves be influenced by changes to the document data stream already made by another active plug-in. The active plug-in makes it appear to a consumer plug-in that a property that the active plug-in has inserted, deleted or modified in the document data stream like it was an original part of the retrieved document. This includes the ability of an active plug-in to insert properties into the document data stream that are intended for the use of specific consumer plug-ins.

After the gatherer process has piped the document data stream through the active plug-ins, it pipes the resulting modified document data stream to one or more consumer plug-ins. A consumer plug-in is "read only" in that it cannot modify the document data stream like an active plug-in. Since the consumer plug-in processes the modified document data stream, the active plug-ins can tailor the original document data stream into a form that is more useful to the consumer plug-in. The document data stream is more "useful" to the consumer plug-in if the consumer plug-in can process the document data stream, as modified by the active plug-ins, more effectively or more efficiently than the consumer plug-in would have been able to process the original document data stream as it was retrieved from the document. For instance, an active plug-in can insert a property into the document data stream of a document that a consumer plug-in should process, while removing inaccurate or deceptive properties from the document data stream that could cause the consumer plug-in to process the document in a way that it really should not. In the case of a consumer plug-in that builds an index, the modified document data stream improves the quality of the index built by the consumer plug-in by enabling the consumer plug-in to process the information more accurately based on the modified content provided by the active plug-ins. As will become apparent in the discussion below, the active plug-ins allow an automated customizable way for editing, annotating, and/or censoring of documents that are provided to consumer plug-ins. Automating these functions is advantageous because of the immense volume of documents contained on Web sites connected to the Internet, an intranet, and other computer networks. The method and system of the present invention also advantageously provides a way to alter the contents of the retrieved documents without affecting the original documents that the administrator of the site running the gatherer does not own or have access rights to.

Since the active plug-ins alter the content of the document data stream, the order in which they are piped the information by the gatherer process is important because the active plug-ins each receive the document data stream as it has been modified by all previous active plug-ins through which it has traveled. The invention also makes it possible to delete data from the document data stream so that some or all portions of a retrieved document are not to be forwarded to subsequent active plug-ins and consumer plug-ins. Those knowledgeable in the art will understand that the description herein of "piping the data" is used metaphorically and is actually done by passing reference pointers to locations in memory, COM interfaces, or by some other method well known in the art. The COM interface protocol is available from Microsoft Corporation, Redmond, Wash.

In accordance with further aspects of this invention, the gatherer, the active plug-ins, and the consumer plug-ins are modeled as objects. The objects have interfaces that are visible in a global namespace, or a distributed namespace in a distributed system, which permits objects to communicate with each other, to read each other's properties and use each other's methods. This property makes the invention extensible because the modular nature of objects allows the active plug-ins and the consumer plug-ins to be "plugged-in" to the gathering process, as needed, to support the goals of a given Web crawling project. This property also means that the objects comprising the gatherer process, the active plug-ins, and the consumer plug-ins need not be executed on the same computer, but can be stored and linked together across a network from any server computer that has access to the distributed namespace.

In accordance with still further aspects of this invention, the active plug-ins are able to control the gatherer process by sending messages with the requested action to the gatherer object.

As will readily be appreciated from the foregoing summary, the present invention provides a method and system for retrieving a document data stream from a Web document residing on a Web server, and modifying that document data stream using active plug-ins before passing the document data stream to consumer plug-ins for final processing. Other features of the invention are described below.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is a mechanism for obtaining and processing information pertaining to Web documents that reside on one or more server computers. A server computer is referred to as a Web site, and the process of locating and retrieving digital data from Web sites is referred to as "Web crawling." The computer program performing the Web crawling is called a gatherer process. A gatherer process retrieves Web documents by visiting the Uniform Resource Locators (URLs) associated with Web documents that have been placed in a queue referred to as a transaction log. Before the URL is inserted into the transaction log, the URL is compared to the exclusion rules for the project. These rules define the scope of the crawl and define the range of URLs that are added to the transaction log. While the following discussion describes the invention in terms of crawling the World Wide Web, the present invention is not limited to the Internet, an intranet, or the Web and may be used in any application where electronic information is retrieved from a local computer or a computer network.

Besides retrieving documents originally placed in the transaction log, the gatherer process recursively gathers document URLs referenced in hyperlinks in retrieved documents and inserts those URLs (subject to the gathering rules) into the transaction log so that they also will be retrieved by the gatherer process during the gathering project, or Web crawl. The Web crawl is complete when every URL in the transaction log has been visited. A URL can be thought of as an address on the network where the Web document is located. If the gatherer process is able to retrieve the Web document at the URL listed in the transaction log, the document data is retrieved and processed as discussed in detail below. As used herein, the term "Web document" or "document" refers to all data resources available to the gatherer process during the Web crawl. Examples of data resources are files, HTML documents, database rows, mail messages and meta-documents such as file system directories and mail folders.

Figure 1:
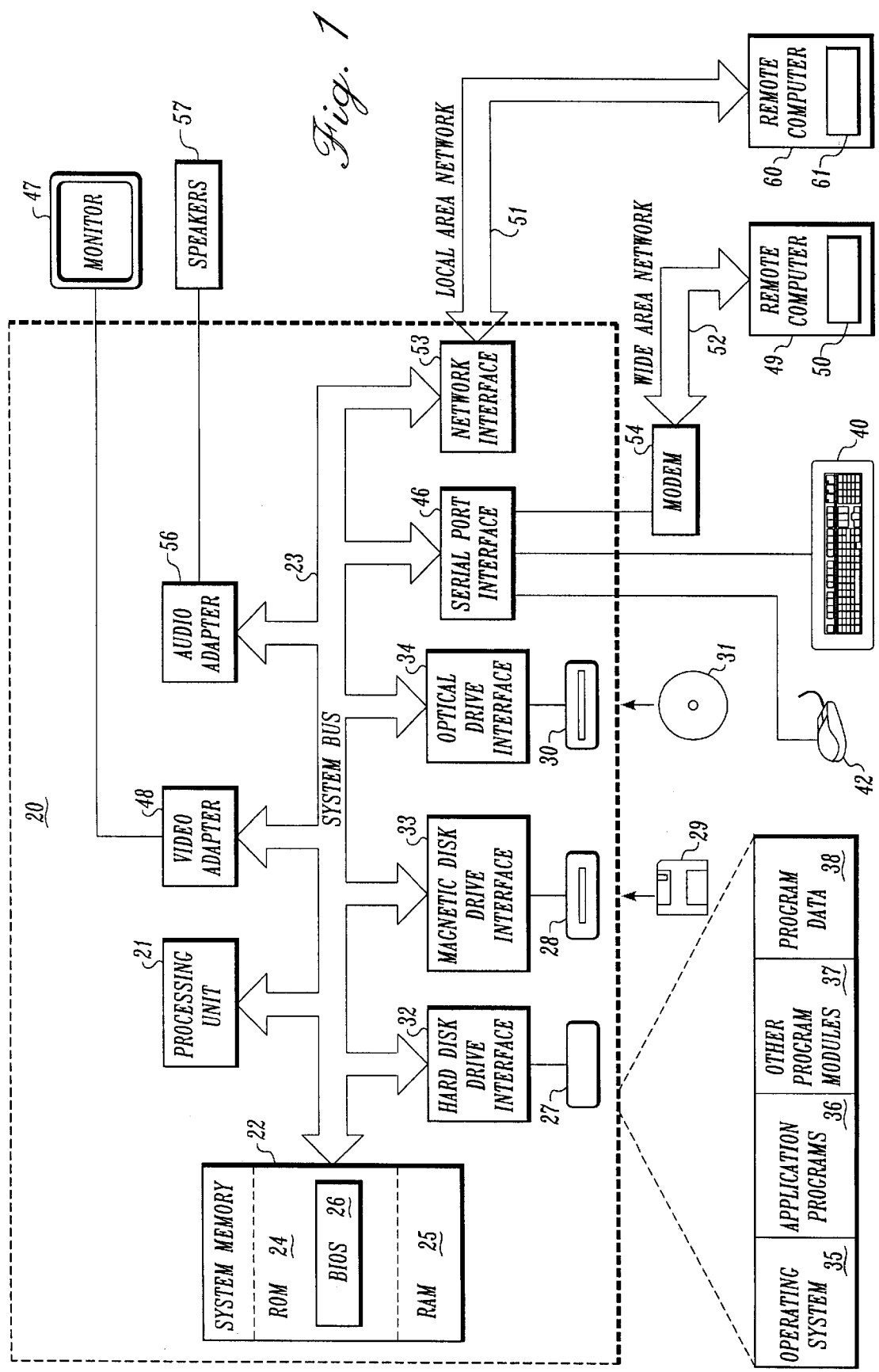
FIG. 1 is a block diagram of a general-purpose computer system for implementing the present invention.

In accordance with the present invention, the gatherer process executes on a computer, preferably a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM, and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 operates in a networked environment using logical connections to one or more remote computers, such as remote computers 49 and 60. Each remote computer 49 or 60 may be another personal computer, a server, a router, a network PC, a peer device or other common network node, and typically includes many or all of the elements described above relative to the personal computer 20, although only a memory storage device 50 or 61 has been illustrated in FIGURE. The logical connections depicted in FIG. 1 include a local area network (LAN) 51 and a wide area network (WAN) 52. Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
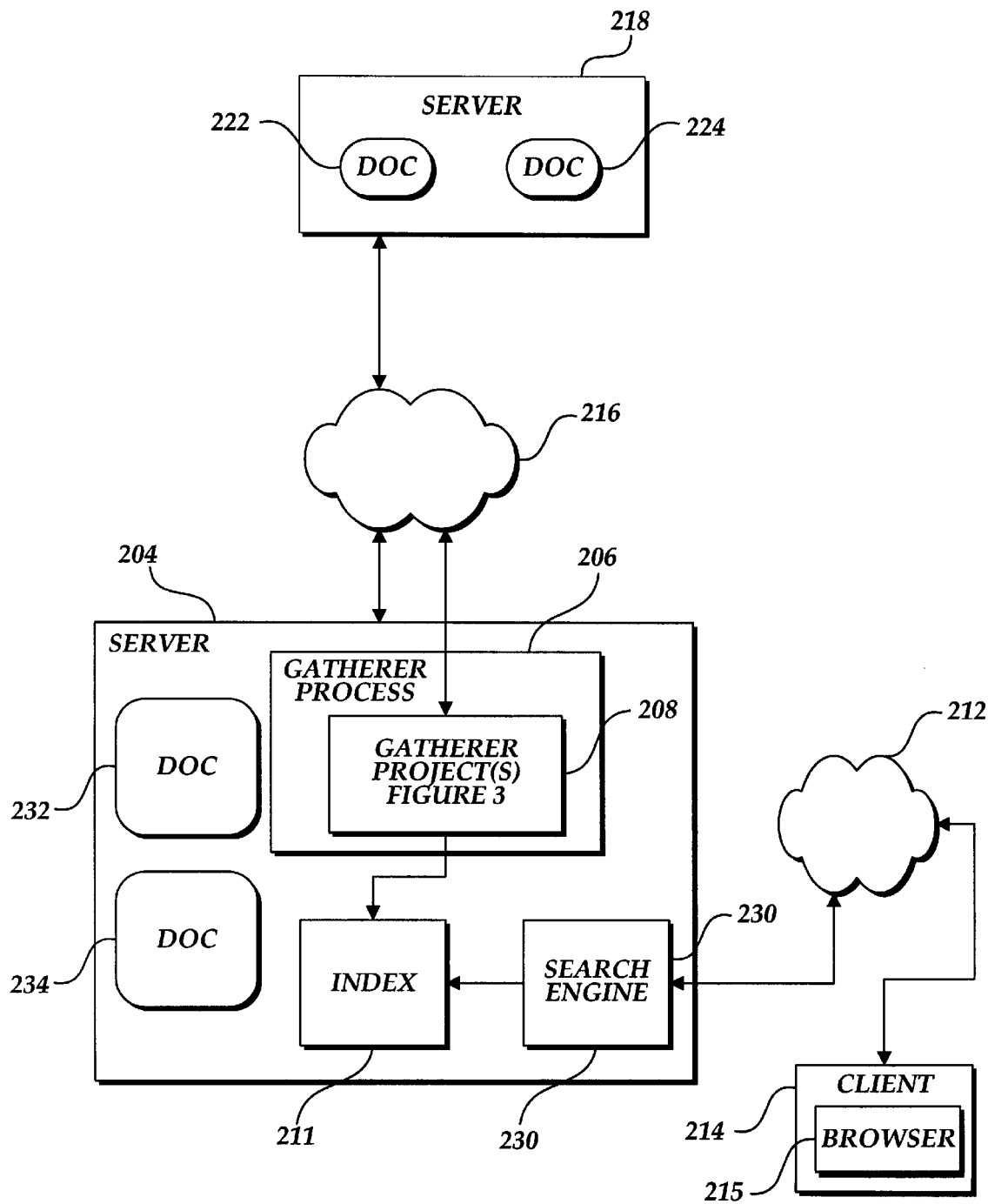
FIG. 2 is a block diagram illustrating a network architecture, in accordance with the present invention.

FIG. 2 illustrates a networked system architecture in which the present invention operates. A server computer 204 includes a gatherer process 206 executing thereon. The gatherer process 206 implements a gatherer project 208 (FIG. 3) that searches for Web documents 222, 224, 232, and 234 that are distributed on one or more server computers connected to a computer network 216, such as a remote server computer 218. The computer network 216 may be a local area network 51 (FIG. 1), a wide area network 52, or a combination of networks that allows the server computer 204 to communicate with remote computers, such as the remote server computer 218, either directly or indirectly. The server computer 204 and the remote server compute 218 are preferably similar to the personal computer 20 depicted in FIG. 1 and discussed above.

The gatherer process 206 searches remote server computers 218 connected to the network 216 for Web documents 222 and 224. The gatherer process 206 retrieves the Web documents and associated data according to the goals of the gatherer project. The information contained in the Web documents 222 and 224, along with the associated data, can be processed for use in a variety of ways. For instance, the information can be processed to create an index 211.

A client computer 214, such as the personal computer 20 (FIG. 1), is connected to the server computer 204 by a computer network 212. The computer network 212 may be a local area network 51, a wide area network 52, or a combination of networks. The computer network 212 may be the same network as the computer network 216 or a different network. The client computer 214 includes a computer program, such as a "browser" 215 that locates, retrieves, and displays Web documents to a user. When a user at the client computer 214 desires to search for one or more Web documents, the client computer 214 transmits search criteria to a search engine 230 requesting a search. The search engine 230 examines its associated index 211 and returns a list of Web documents to the browser 215 at the client computer 214 that conform to the search criteria and that may be desired by the user. The user may then examine the list of documents and retrieve one or more desired Web documents from remote computers such as the remote server computer 218. As will become apparent in the foregoing description, the creation of an index 211 with a gatherer process and the use of the index 211 by a search engine 230 that has been queried by a Web browser 215 is an example of one of many client or consumer applications that may employ the present invention.

The computer networks illustrated in FIG. 2 are exemplary, and alternative configurations may also be used in accordance with the invention. For example, the server computer 204 itself may include Web documents 232 and 234 that are accessed by the gatherer process 206. The Web browser program 215 and the gatherer process 206 may also reside on a single computer. As discussed above, the client computer 214, the server computer 204, and the remote server computer 218 may communicate through any type of communication network or communications medium. The computer networks may also share a distributed namespace through which the objects can discover and connect to other objects on the various computers connected to the computer network. A distributed namespace can be formed, for example, through connector objects that interface global namespaces existing on individual machines.

Figure 3:
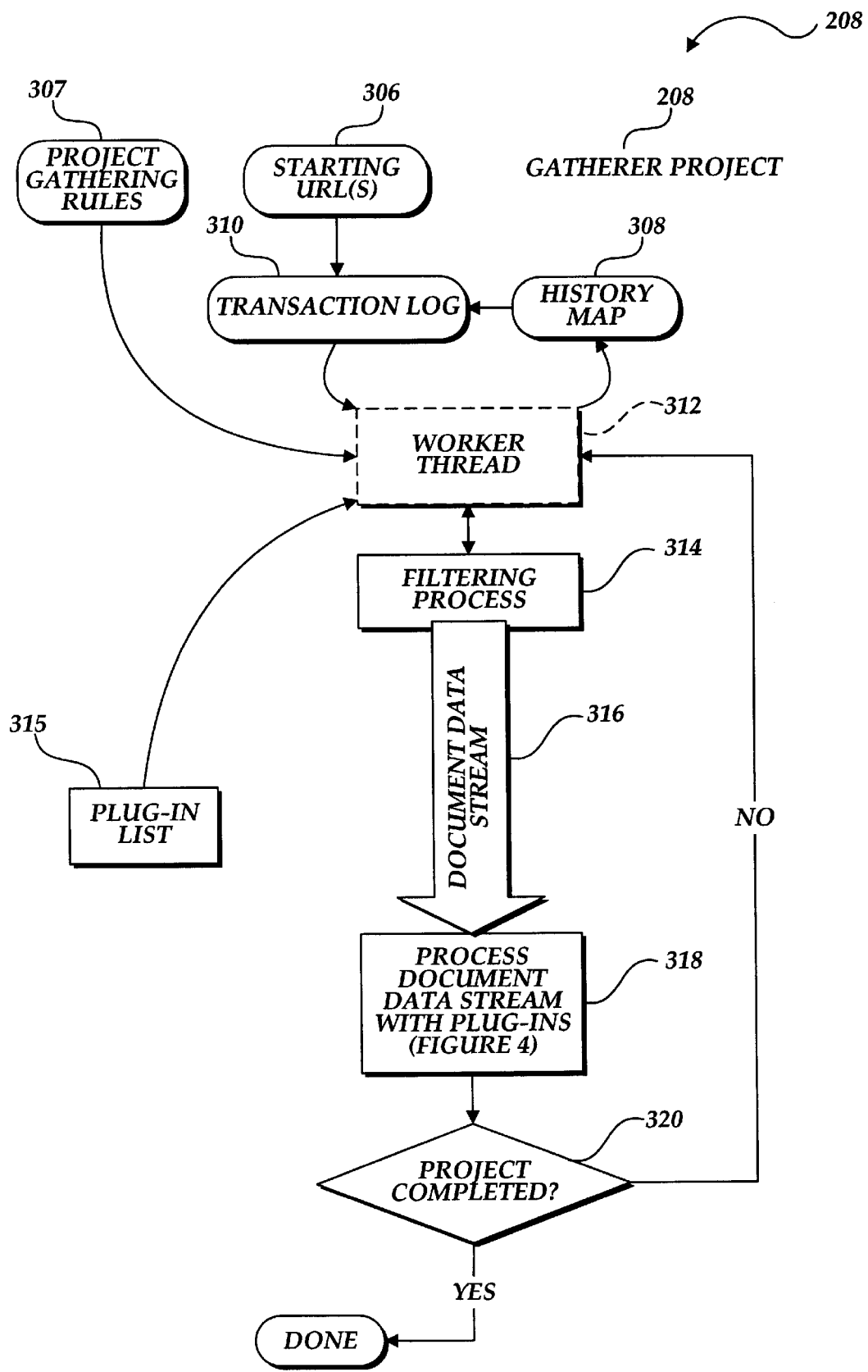
FIG. 3 is a block diagram illustrating an architecture of a gatherer project implemented by a gatherer process, in accordance with the present invention.

FIG. 3 illustrates in greater detail the gatherer project 208 implemented by the gatherer process 206 that performs Web crawling and information processing in accordance with the present invention. There may be multiple projects 208 in the gatherer process 206; a gatherer project 208 is a configuration entity. Each gatherer project 208 has its own transaction log 310, history map 308, seed URLs 306, and gathering rules 307. Each project also has a separate list of plug-ins 315. The gatherer process 206 performs crawling of Web sites and gathering of the Web documents. In a multi-threaded system, one gatherer process 206 can utilize multiple worker threads that concurrently access the transaction log 310 and history map 308, communicate with the filtering processes 314, and push the filtered document data stream into the plug-ins (block 318). Each worker thread 312 will have its own pipeline for the document data stream associated with the document that the worker thread 312 has retrieved. The number of worker threads that can concurrently gather and process Web documents is only limited by the resources available to the gatherer process 206.

The gatherer process 206 begins a crawl by inserting one or more starting document address specifications 306 in a transaction log 310. In the context of the World Wide Web, the document address specifications are referred to as Uniform Resource Locators or URLs. While the present invention is not limited to document address specifications formatted as URLs, for the convenience of the following discussion document address specifications will be referred to as URLs. A URL, or Web document address, comprises specifications of a protocol, a domain, and a path within the domain. On the Web, the domain is also referred to as the "host."

The starting URLs 306 serve as seeds, instructing the gatherer process 206 where to begin its crawl. A starting URL can be a universal naming convention (UNC) directory, a UNC path to a file, or an HTTP path to a document. As used herein, the term "document" refers to all data resources available to the gatherer process 206 during the crawl. Examples of these data resources include files, HTML documents, database entries, mail messages and meta-documents such as file system directories and mail folders.

When the crawl starts, the gatherer process 206 inserts the starting URLs 306 into the transaction log 310, which maintains a list of URLs that are currently being processed or have not yet been processed. The transaction log 310 functions as a queue. It is called a log because it is preferably implemented as a persistent queue that is written and kept on a disk to enable recovery after a system failure. Preferably, the transaction log 310 maintains a small in-memory cache for quick access to the next few transactions. The gatherer project 208 retrieves the Web documents that are listed in the transaction log 310. The Web documents retrieved by the gatherer project 208 can also be limited by a set of project gathering rules 307 that provide the boundaries for the Web crawl. The gatherer project 208 also implements a history map 308, which contains a persisting list of all URLs that have been visited or attempted to be visited during either the current Web crawl or a previous Web crawl.

When operated in a multithreaded computer system, the gatherer process 206 can employ a plurality of worker threads 312 to concurrently process a plurality of URLs. Each worker thread 312 retrieves a URL from the transaction log 310 and passes the URL to a filtering process 314. Preferably, the filtering is done outside the gatherer process 206 for robustness—the filtering process can fault and be restarted if it receives corrupted data. By adding additional components for filtering different document formats, the filtering process 314 can also retrieve documents in formats that are unknown to the gatherer process and access documents using different protocols. The filtering process 314 uses the access method specified in the URL to retrieve the Web document. For example, if the access method is HTTP, the filtering process 314 uses the HTTP protocol to retrieve the document. If the access method specified is FILE, the filtering process 314 uses file system commands to retrieve the corresponding documents. The File Transfer Protocol (FTP) is another other well known access method that the filtering process 314 may use to retrieve a document. Other access protocols, such as database retrieval specifications may also be used in conjunction with the invention.

The filtering process 314 performs conversion (filtering) of the native document format into the document data stream 316, which is comprised of a uniform representation of contents and properties. In the case of an HTML document, each "interesting" tag is converted by the filtering process 314 to a separate property in the document data stream 316. The gatherer process 206 is interested in content and in meta-tags that contain substantive information like the document's author, the language the document is in, the character set used in the document and other substantive information that could be useful in processing the contents of the document. The gatherer is generally not "interested" in tags that describe how to render the HTML document in the browser window. HTML documents may also contain hyperlinks to other documents. These hyperlinks are retrieved from the document data stream 316 by the worker thread 312 and inserted into the transaction log 310 so that documents referenced within Web documents will recursively be visited during the crawl.

Properties (often referred to as "tags" in a Web document) are used by client applications such as the Web browser 215 to process the Web document's data. For instance, a property may contain a hyperlink with a specification of a URL. If the document referenced in the hyperlink is an image, the Web browser program 215 uses the URL to retrieve the image and render it on the Web page. Similarly, the hyperlink may specify the address of a document that contains audio data. If a hyperlink points to audio data, the Web browser program retrieves the audio data and plays it. An "anchor" tag specifies a visual element and a hyperlink. The visual element may be text or a hyperlink to an image. When a user selects an anchor having an associated hyperlink in a Web browser program 215, the Web browser program 215 automatically retrieves a Web document at the address specified in the hyperlink.

Figure 4:
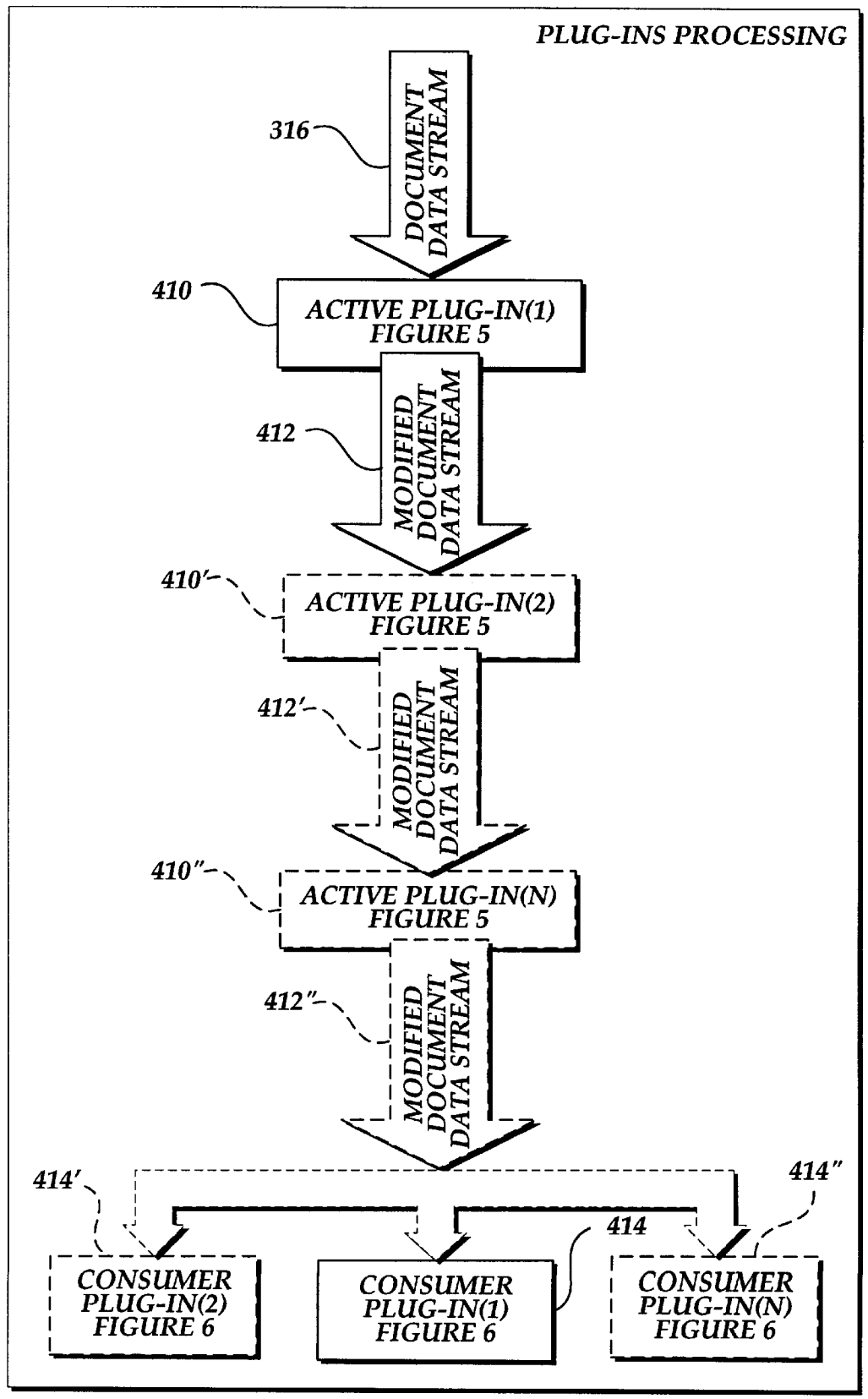
FIG. 4 is a functional flow diagram illustrating the piping of document data to active and consumer plug-ins, in accordance with the present invention.

The processing of the document data stream 316 is shown in detail in FIG. 4. After the worker thread 312 retrieves the Web document information, it pipes the resulting document data stream 316 to a plurality of "plug-ins" that processes the data (block 318). In accordance with the present invention, the gatherer process 206 processes the information contained in Web documents by first passing the information to one or more active plug-ins 410. An active plug-in 410 is a computer program that can modify the retrieved information by inserting into, deleting from, or modifying content or properties or by inserting or deleting other information from the retrieved document data stream. This produces a modified document data stream 412 that is either passed to a subsequent active plug-in 410' or to one or more consumer plug-ins 414.

A consumer plug-in 414 is a program that processes the document data stream 412. The manner in which the consumer plug-in 414 processes the information can be controlled by way of the contents and properties that were modified by the active plug-ins 410. An example of a consumer plug-in is an indexing engine that creates and maintains an index 211 of Web documents. An example on how an active plug-in can influence processing by the indexing engine would be adding an annotation, or category, or a special property to the document data stream that would instruct the indexing engine to remove the current document from the index. In this way, the index more accurately reflects the subject matter that it is intended to contain, which provides better search results to the users using the index.

The invention does not require that the consumer plug-in be limited to creating indexes for search engines. Rather, any consumer plug-in that would benefit from properties or other data being inserted, removed or modified from the document data stream 412 before being sent to the consumer plug-ins 414 or any consumer plug-in that would benefit from the crawler retrieving a set of Web documents and converting the plurality of document formats into a unified data stream of text and properties, is within the contemplation of the invention. Because the gatherer process 206, the active plug-ins 410, and the consumer plug-ins 414, are all objects visible in a distributed namespace, they may run and/or be stored on the same or different computers connected to the distributed system.

The plug-ins 410, 410', 410", 414, 414' and 414" are plugged-in to the gatherer project by listing them in a plug-in list 315 (FIG. 3), which may be modeled as a collection object. After retrieving a Web document and parsing it into a document data stream 316, the worker thread 312 iterates through the list of plug-ins 315, piping the document data stream 316 to each plug-in in the list 315. As will be discussed in detail below, the order that the document data stream is piped to the active plug-ins 410 is important because the active plug-ins 410 can make cumulative changes to the copy of the Web document data retrieved by the worker thread 312.

In an actual embodiment of the invention, contents and properties are added, deleted or otherwise modified in the originally retrieved document data stream 316 according to decision criteria contained in the active plug-ins 410 to produce a modified document data stream 412. The modifications made by the active plug-ins 410 are intended to be used by one or more consumer plug-ins 414 when the modified document data stream 412 is piped to them. For example, an active plug-in 410 may analyze the content of the document data stream 316 and determine that a property should be inserted in the modified document data stream 412 that identifies a subject or category into which the contents of the Web document falls, the language the document is in, an analysis of the document's semantics, or other areas that will be apparent to those skilled in the art.

Properties inserted by active plug-ins can then be used, for instance, by an indexing engine consumer plug-in 414 to create an index that can serve search queries that return only those documents with a property indicating a particular category. The active plug-ins improve the quality of the results produced by the consumer plug-ins because the produced index will have better quality if a document is categorized before it gets indexed. In this example, the added properties enable the search engine to serve queries on categories rather than precise word searches.

Active plug-ins may be used in varying combinations, depending upon the requirements of the gatherer project. For instance, a gatherer project may be created that seeks to index all Web documents found during a Web crawl that are medical discussions of breast cancer. While a simple word search for this subject matter would invariably return some pornographic sites, an active plug-in designed to screen for and "tag" pornographic sites could be "plugged-in" to the gatherer project 208 so that a consumer plug-in 414, like an indexing engine, does not index sites tagged as pornographic. In an actual embodiment of the invention, tagging the document is accomplished by inserting a property into the modified document data stream 412. For example, an active plug-in could insert a special property ( such as META NAME=ROBOTS CONIENTS=NOINDEX) in the document data stream that instructs the indexer to throw away the document being processed.

The invention also contemplates that the active plug-ins 410 can remove or modify text and properties in the document. For instance, the active plug-in just described (or a separate active plug-in) could screen for inaccurate or deceptive properties that indicate that the pornographic site has medical information and remove those properties from the modified document data stream 412 so that the document is not mistakenly indexed by the indexing engine consumer plug-in 414. The active plug-in 410 can also prevent subsequent active plug-ins 410' and 410" from receiving the contents of a document data stream 316 by removing some or all of the content or properties from the modified document data stream 412 or 412', before it is forwarded to the next plug-in 410' or 410."

It will be apparent to those skilled in the art that an active plug-in 410 such as the one described has many uses in gatherer projects other than the particular example given. For instance, a user could combine a categorizing active plug-in with a screening active plug-in, with an annotating active plug-in. Annotations allow users to add their comments to the document copy contained in the document data stream 412 without editing the actual document stored at the Web site.

Active plug-ins 410 can be used in combination by sequentially piping the evolving document data stream (e.g., 316, or 412, or 412', or 412") to the next active plug-in 410 in the plug-in list 315. Continuing the example given above, the modified document data stream 412, which has been modified by the first active plug-in 410, could be then be piped to a second active plug-in 410' that analyzes the modified document data stream 412 to determine whether it is a medical article and tag the modified document data stream 412' accordingly. Once processed in this manner, the modified document stream 412' can be piped to one or more consumer plug-in 414, such as an indexing engine that is configured to index only documents with a category "medical document" property and lacking a category "pornographic" property. Alternatively, according to the invention, the active plug-ins 410 can direct the worker thread 312 not to forward some or all of the irrelevant documents to subsequent plug-ins 410 and 414.

The order that active plug-ins 410 are listed in the plug-in list 315 is important because the active plug-ins 410 have the ability to modify the text and properties contained in the document stream before that information is piped onto the next active plug-in 410'. In other words, a subsequent active plug-in 410' may be influenced by modifications to the document data stream 316 or 412 made by previous active plug-ins 410, as is discussed in more detail below with reference to FIG. 5. FIG. 4 also illustrates that once the active plug-ins 410 have finished processing the document data stream 315, the gatherer worker thread 312 pipes the now modified document data stream 412 to one or more consumer plug-ins 414. Because a consumer plug-in 414 is read-only, the order that the document data stream is fed to them is unimportant. The document data stream may be fed to these consumer plug-ins either sequentially or concurrently, according to the requirements of a project.

Figure 5:
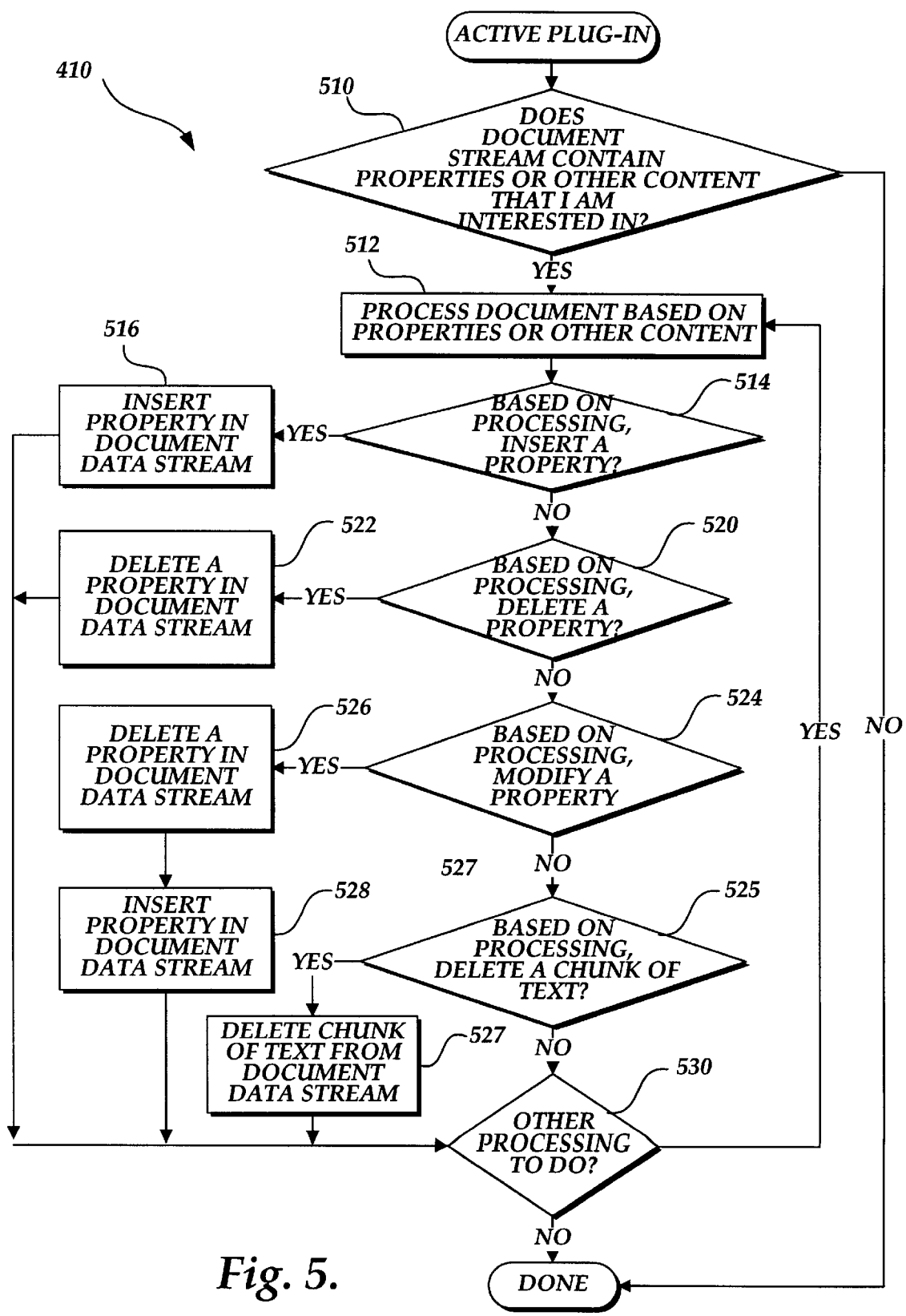
FIG. 5 is a functional flow diagram illustrating the use of active plug-ins, in accordance with the present invention.

The operation of the active plug-in contemplated by the invention is illustrated in FIG. 5. If the active plug-in is the first in the plug-in list 315, it receives the document data stream 316 as input and outputs a modified document data stream 412. Subsequent active plug-ins (e.g., 410' and 410") listed in the plug-in list 315 receive the modified document data stream (e.g., 412 or 412') that is output by the active plug-in (e.g., 410 or 410') that immediately precedes it in the plug-in list 315, and outputs a further modified document data stream (e.g., 412' or 412"). For the convenience of the following discussion, references to the modified document data stream 412 are intended to include the information as retrieved from the Web document and as it has been cumulatively modified by all active plug-ins 410 through which the information has been piped.

When the active plug-in 410 is piped the modified document data stream 412 by the worker thread 312, the active plug-in 410 first determines whether it is interested in the properties or other data in the modified document data stream 412 (decision block 510). If the active plug-in 410 it is not interested in the content of the modified document data stream 412, the active plug-in 410 is finished with the modified document data stream 412 and the worker thread 312 pipes the modified document data stream 412 to the next plug-in in the plug-in list 315. If the active plug-in 410 is interested in the content of the modified document data stream 412, it processes the modified document data stream 412 in a block 512 based on its contents or included properties. The active plug-in 410 can then modify the document data stream 412 by inserting, deleting, or modifying a property in the document data stream 412. If the active plug-in 410 decides in a decision block 514 to insert a property, or a chunk of text, based on its processing of the document stream, a property or a chunk of text is inserted in the document data stream 412 at a block 516. If the active plug-in 410 decides in a decision block 520 to delete a property based on its processing of the document data stream 412, then the property is deleted from the document data stream 412 at a block 522. If the active plug-in 410 decides in a decision block 524 to modify a property based on its processing of the document data stream 412, the property is first deleted from the document data stream 412 in a block 526 and then a modified property is substituted by inserting it in the document data stream 412 in a block 528. The active plug-in can also decide to delete a chunk of text (block 525) by not forwarding that chunk of text in the document data stream 412 (block 527).

Since multiple properties can be inserted, deleted or modified from each document data stream 412, the active plug-in 410 determines in a decision block 530 whether there is other processing to do or properties to add, delete or modify in the modified document data stream 412. If other processing is to be done, the processing of the document data stream 316 or 412 returns to block 512, and the process described above repeats. When it is determined in the decision block 518 that the active plug-in 410 is finished with the modified document data stream 412, the worker thread 312 is notified that the active plug-in 410 is done with the modified document data stream 412.

Figure 6:
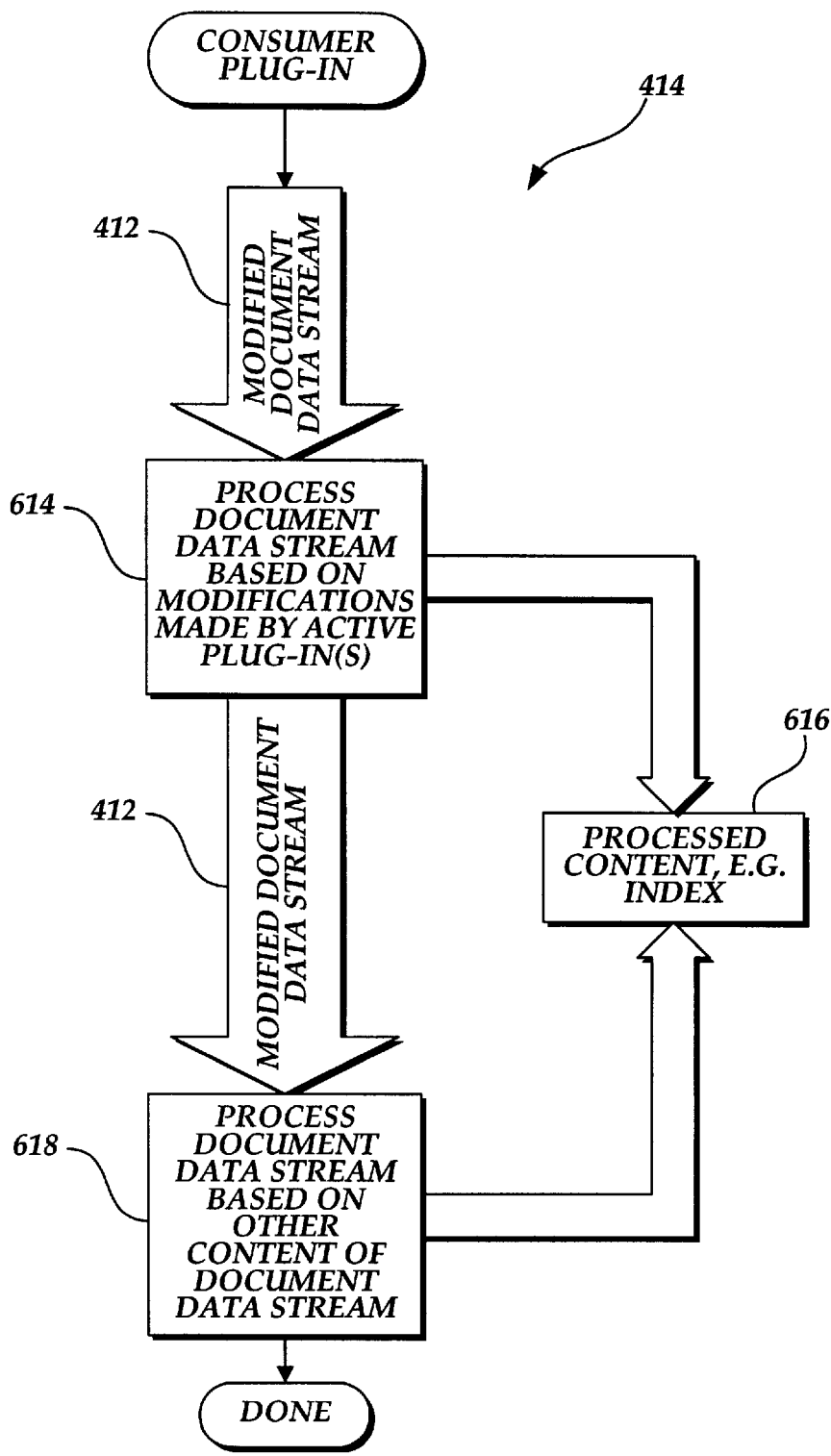
FIG. 6 is a functional flow diagram illustrating the use of consumer plug-ins, in accordance with the present invention.

After the modified document data stream 412 has been modified by one or more active plug-ins 410, the worker thread 312 pipes the modified document data stream 412 to one or more consumer plug-ins 414 (which are listed in the plug-in list 315 following the active plug-ins 410). The process implemented by a consumer plug-in 414 is illustrated in FIG. 6. When the consumer plug-in 414 receives the modified document data stream 412 in block 612, the modified document data stream 412 is processed by the consumer plug-in 414 as it has been modified by the active plug-ins 410. As is discussed above, the active plug-ins 410 may have inserted properties, modified properties, or deleted properties, which effect the manner in which the document information is processed in a block 614.

While the present invention is not limited to this specific application, the information retrieved from the Web document is usually processed into some stored content such as an index, as is shown in block 616. As shown in a block 618, the consumer plug-in 414 can also process the information retrieved from the Web document based on the original content of the document data stream 316 and combine the result with the processed content (e.g., the index) shown in the block 616. While the processing in blocks 614 and 618 are represented as separate steps, in an actual embodiment of the invention, the active plug-ins are transparent to the consumer plug-ins. The logic of the processing that occurs in a consumer plug-in does not directly depend on the fact that there are active plug-ins included in the gathering project, but the manner in which the consumer plug-in processes the data will depend on how the data is presented to the consumer plug-in after being processed by the active plug-in.

In an actual embodiment, the method and system of the present invention is realized using an object-oriented programming paradigm. An object-oriented programming paradigm views blocks of computer-executable instructions and data as a collection of discrete objects that interact with other objects. One of the primary benefits of object-oriented programming is that the objects can easily and affordably be adapted to meet new needs by combining them in a modular fashion. An object is a unit of code comprising both routines and data (also called methods and properties) and is thought of as a discrete entity. The structural foundation for an object-oriented language is the object model. The goals of this model are encapsulation, persistence, polymorphism, abstraction, concurrency, and typing. The component object model (COM), the distributed component object model (DCOM), and object lining and embedding (OUR) produced by Microsoft Corporation of Redmond, Wash., are examples of object models. The present invention may be practiced under any of these object models or many others that are well known to those skilled in the art.

Objects communicate with each other through interfaces. Each object may have multiple interfaces. An interface exposes and defines access to the object's public properties and methods. For instance, in Microsoft's COM, all objects are required to support the IUnknown interface. The IUnknown interface includes a method named Query interface through which other objects in the global namespace (or a distributed namespace in a distributed system) can request and receive pointers to the objects' other interfaces. One of the primary advantages to interfaces is that a client object can continue to access the methods of a server object that are exposed through the interface regardless of whether the underlying code in the object is updated or changed for another reason.

The present invention is comprised of a plurality of objects that can communicate with each other through defined interfaces that can be accessed through pointers obtained from the IUnknown interface. The interfaces defined by the present invention are discussed in detail below with reference to FIG. 7. Because the active plug-ins 410 and the consumer plug-ins 414 are modeled as objects, they can be inserted, interchanged and reordered in a given gatherer project 208 as required for the particular project's goals.

Figure 7:
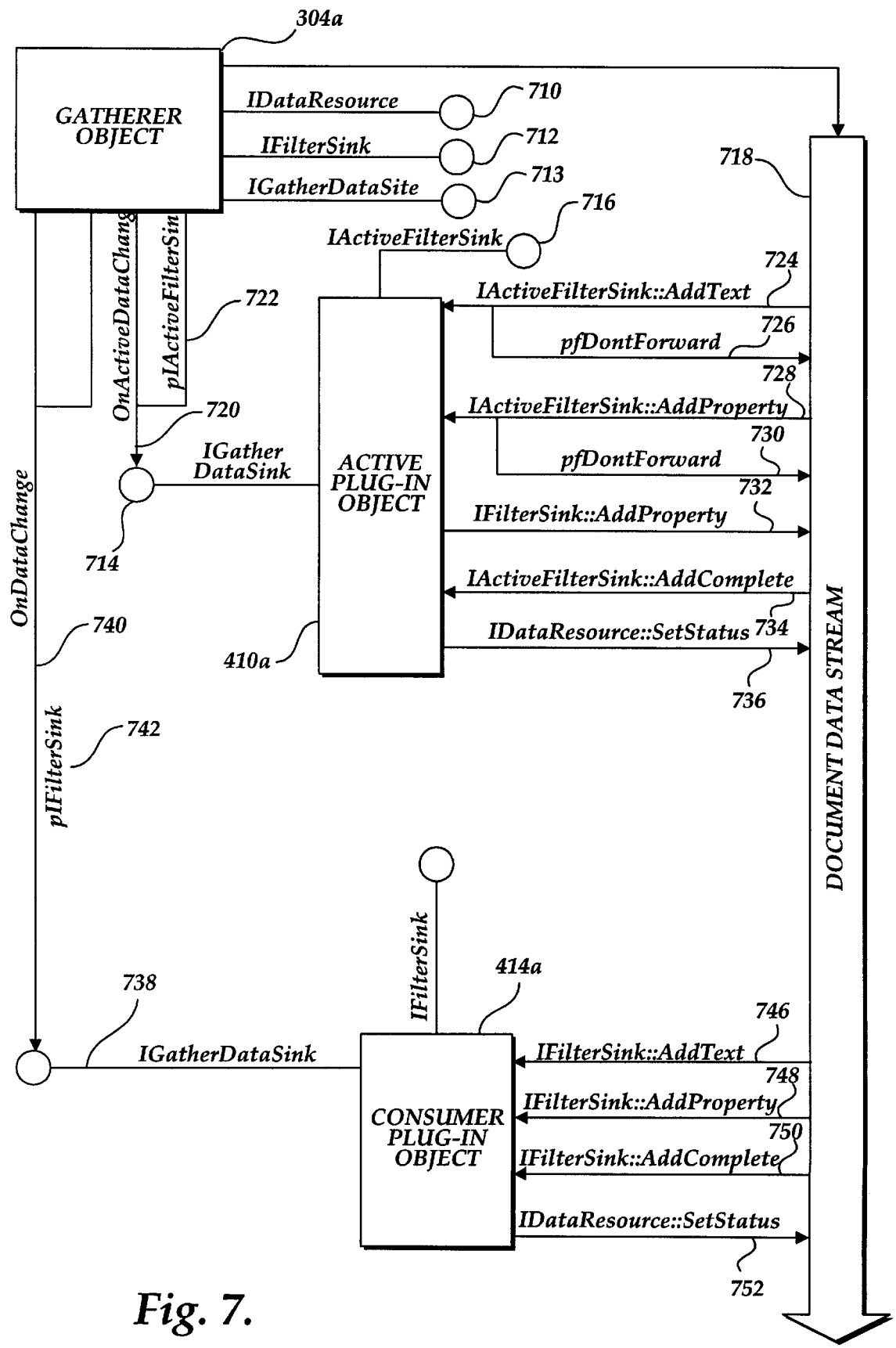
FIG. 7 is a functional flow diagram illustrating some of the interfaces and messages used by the present invention.

FIG. 7 illustrates an actual embodiment of the present invention that is programmed to be compliant with the Microsoft Component Object Model (COM) and the Microsoft Distributed Component Object Model (DCOM). As shown in FIG. 7, the active plug-in 410a, the consumer plug-in 414a, and the gatherer 304a are all modeled as objects. These objects are all visible in a global namespace that associates the name of the object with its location in memory. When the invention is practiced in a distributed system the global narespace is referred to as a distributed namespace.

As discussed above, each object exposes one or more interfaces in the global namespace. All objects compliant with COM make the IUnknown interface visible in the global namespace. An object calling the IUnknown::QueryInterface method can obtain connections to all other interfaces available to external users of the object. Interfaces provide the mechanism through which objects can communicate with each other. Three of the interfaces exposed by the gatherer are IDataResource 710, IFilterSink 712 and IGatherDataSite 713. The IDataResource interface 710 can be used by plug-ins 410*a* and 414*a* to access information about the document currently being processed by the worker thread 312. For instance, the plug-in 410*a* or 414*a* can discover through this IDatResource mterface the document ID assigned by the gatherer to the resource, the alphanumeric URL, the MIME type, the class ID of the object that created the document, the name of the host that was used to create the resource, whether the reference is to a directory, the size of the file in bytes, the last modified date of the resource, an MD5 checksum of the resource after filtering, the ID assigned by the gatherer to the resource, and the local file name of the document, if the gatherer made a local copy of the document on its hard disk. The worker thread 312 can also notify the plug-in 410*a* or 414*a* through the IGatherDataSink interface 714 or 738 when it has completed the crawl by finishing processing of its transaction log 310 or any other status change such as the crawl was stopped or shut down. Similarly, the plug-ins 410*a* or 414*a* can notify the gatherer 304*a* through the IDataResource interface 710 that they are finished processing the document data stream 718.

The gatherer 304*a* also exposes the IFilterSink interface 712. This interface is used by the active plug-in object 410*a* to insert contents and properties into the modified document data stream 412 and discussed in detail below. The active plug-in object 410*a* exposes an IGatherDataSink 714 and an IActiveFilterSink 716 interface in the global namespace. The gatherer 304*a* pipes the document data stream 718 first to the active plug-in object 410*a* and then to the consumer plug-in object 414*a*. As discussed above, there may be a plurality of active plug-in objects 410*a* and a plurality of consumer plug-in objects 414*a*, all of which operate in the manner that is described in the following discussion.

The method and system of the active plug-in 410*a* illustrated in FIG. 5 will now be discussed in terms of the messages that are communicated between the objects by the active plug-in object 410*a* in an actual embodiment of the invention. When the gatherer 304*a* pipes the document data stream 718 to the active plug-in object 410*a*, it calls the OnActiveDataChange method 720 of its IGatherDataSink interface 714. In response, the active plug-in object 410*a* returns a pointer (pIActiveFilterSink) to the active plug-in object's 410*a* IActiveFilterSink interface 716. The active plug-in object 410*a* is passed a pointer (pIFilterSink) to the IFilterSink interface of the gatherer 304*a* in the OnActiveDataChange call, since the filter sink is bound to a particular document currently being processed. Therefore, there may be multiple instances of the data resources and filter sinks in the system.

It should be noted that the document data stream 718 generally refers to the original document data stream 316 and the modified data stream 412, indicating that the document data stream 718 goes through an evolution as it continues to be processed by the active plug-ins 410*a*. The active plug-in uses the IFilterSink interface on the gatherer object 304*a* to add properties and text. The implementation of the IFilterSink interface in the gatherer routes the function calls to add text and properties to subsequent active plug-ins 410*a*. The changes made by one active plug-in are propagated to the rest of the plug-ins 410*a* in this manner.

As the gatherer 304*a* retrieves the Web document, it notifies the active plug-in object 410*a* of chunks of text using the IActiveFilterSink::AddText method 724. If the active plug-in object 410*a* does not want this text chunk forwarded in the document data stream 718, it replies with a message 726 (pfDontForward) which instructs the worker thread 312 not to forward the data chunk to the next plug-in 410*a* or 414*a* to which the document data stream 718 will go. The active plug-in object 410*a* is similarly notified of properties within the document data stream 718 through the IActiveFilterSink::AddProperty method 728. If the active plug-in object 410*a* decides that this property should not be forwarded in the document data stream 718, then it replies with a pfDontForward message 730. In this manner, text and properties can be removed from the document data stream 718. This is illustrated by blocks 522, 526, 525, and 527 of FIG. 5. Properties and text can also be inserted into the document data stream 718 (as shown in blocks 516 and 528 of FIG. 5), through the IFilterSink interface 712 exposed by the gatherer 304*a* in the global namespace. A property inserted by the active plug-in object 410*a* is added to the document data stream 718 by invoking the gatherer's 304*a* IFilterSink::AddProperty method 732.

When the gatherer 304*a* is finished piping the document data stream 718 through the active plug-in objects 410*a*, it informs the active plug-in object 410*a* of this fact by calling the LIctiveFilterSink::AddComplete method 734. When the active plug-in object 410*a* is finished processing the document, it communicates this fact to the gatherer 304*a* through the gatherer's IDataResource interface 710 by calling IDataResource::SetStatus method 736. The methods and messages 724, 726, 728, 730, 732, 734, and 736 are repeated, as necessary, for each document retrieved by the gatherer 304*a* and piped into the document data stream 718. As discussed above, a document placed in the document data stream 718 can be piped through a plurality of active plug-in objects 410*a* that can add, delete, or modify properties based either on the original content of the document or on properties or contents placed in the document by active plug-in objects 410*a* through which the gatherer 304*a* has previously piped the document data stream 718.

Once the document data stream 718 has been piped through all active plug-in objects that may be interested in preprocessing the data, the gatherer 304*a* pipes the document stream 718 to one or more consumer plug-in objects 414*a*. The gatherer 304*a* establishes contact with the consumer plug-in object 414*a* by calling the OnDataChange method 740 of the IGatherDataSink interface 738. In response, the consumer plug-in object 414*a* returns a pointer (pIFilterSink) 742 to the IFilterSink interface 744 exposed by the consumer plug-in object 414*a*. The consumer plug-in object 414*a* is informed of chunks of text in the document data stream 718 by calling the IFilterSink::AddText method 746. Similarly, the consumer plug-in object 414*a* is informed of properties in the document data stream 718 through the IFilterSink::AddProperty method 748.

The consumer plug-in object 414*a* processes the document according to its function, which may include actions that are dependent on finding a property in the document data stream 718 that was inserted or otherwise modified by an active plug-in object 410*a*. When the gatherer is finished adding text and properties to the consumer plug-in object, it calls the IFilterSink::AddComplete method 750. The consumer plug-in object 414*a* informs the gatherer 304*a* of when it is finished processing the document contained in the document data stream 718 by first establishing contact with the gatherer object 304*a* through the IDataResource interface 710, as discussed above, and calling the SetStatus method 752. Because the consumer plug-in object 414*a* is not able to alter the data stream 718, as is the active plug-in object 410a, the document data stream 718 can be piped to a plurality of consumer plug-in objects 414a sequentially or concurrently for processing according to the individual decision criteria of the modular consumer plug-in objects 414a.

Figure 8:
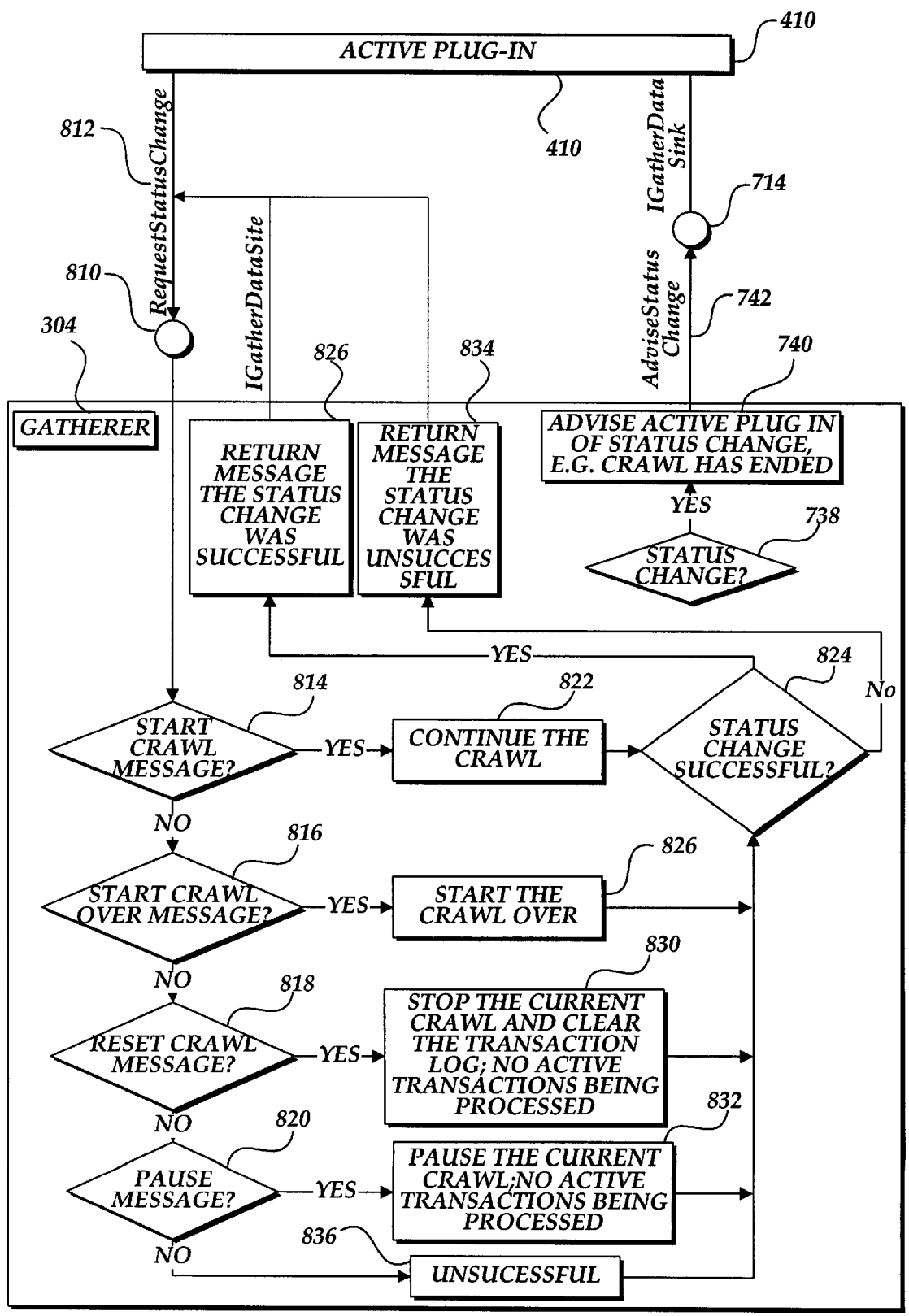
FIG. 8 is a functional flow diagram illustrating the method that a plug-in uses to control the gatherer process.

As illustrated in FIG. 8, the method and system of the present invention also describe an active plug-in 410a that can control the crawl being conducted by the gatherer 304a through the IGatherDataSite interface 810 exposed by the gatherer 304a. To change the status of the crawl, the active plug-in 410a calls the IGatherDataSite::RequestStatus-Change method 812 along with a message indicating the plug-in's requested status change. A series of decision blocks 814, 816, 818, and 820 interpret this message and cause the gatherer 304a to take the proper action. If the gatherer 304a is successful in changing the status of the crawl, this is detected in a decision block 824 and a "successful" message is created in block 826 that is reported back to the calling plug-in as part of the RequestStatus-Change method 812.

If the action requested by the plug-in 410a is to start a crawl, it is detected in decision block 814 and the crawl is continued in block 822 if the crawl had been previously paused, as described below. If the message from the plug-in 410a is to start the crawl over, this is detected in a block 816 which causes the gatherer process to start the crawl over in a block 828 and to report that the change was successful by way of decision block 824 and block 826. The active plug-in 410a can also request that the gatherer 304a reset the current crawl by sending a reset crawl message that is detected by decision block 818. The gatherer 304a then stops the current crawl and clears the transaction log 310 in a block 830. The status change made in the block 830 also assures the plug-in that the gatherer 304a is currently processing no active transactions. If the gatherer 304a detects a pause message from plug-in 410a in a block 820, then the gatherer 304a pauses the current crawl in a block 832. Any change in status results in either a successful or unsuccessful message being returned to the active plug-in 410a through decision blocks 824 and 826, or 834, as the case may be. If the gatherer 304a has received the call for the RequestStatusChange method 812 but is unable to process the message, this is detected in a block 836 and reported back to the active plug-in 410a as an "unsuccessful" message from a block 834. Asynchronous status changes in the gatherer 304a are detected by a decision block 338 and a status change message that is assembled in a block 340 is sent to the active plug-in 410a through the IGatherDataSink interface 714 using the AdviseStatusChange method 742.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-based method for processing data retrieved during a crawl of a computer network, comprising:
   retrieving a document in a gathering project;
   parsing the document into a document data stream including contents and properties;
   piping the document data stream to at least one active plug-in, said active plug-in having the capability of modifying the document data stream by adding to, deleting from, or changing the content and/or properties of the document data stream; and
   piping the document data stream to at least one consumer plug-in, said consumer plug-in having the ability to perform an action in response to the modification made by said active plug-in.

2. The method of claim 1, wherein the at least one active plug-in:
   analyzes the document data stream; and
   modifies the document data stream based on the analysis performed by the active plug-in.

3. The method of claim 2, wherein the active plug-in makes a plurality of modifications to the document data stream.

4. The method of claim 2, wherein making the modification to the document data stream comprises adding at least one property to the document data stream.

5. The method of claim 4, wherein the at least one consumer plug-in:
   receives the document data stream after at least one modification has been made to the document data stream by the at least one active plug-in; and
   performs an action in response to the modification made to the original document data stream by the at least one active plug-in.

6. The method of claim 5, wherein the action performed in the at least one consumer plug-in is to discard the document data stream.

7. The method of claim 5, wherein the action performed in the at least one consumer plug-in is to abort processing of the document data stream.

8. The method of claim 2, wherein making the modification to the document data stream comprises deleting at least one property from the document data stream.

9. The method of claim 8, wherein the at least one consumer plug-in:
   receives the document data stream after at least one modification has been made to the document data stream by the at least one active plug-in; and
   performs an action in response to the modification made to the original document data stream by the at least one active plug-in.

10. The method of claim 9, wherein the action performed in the at least one consumer plug-in is to discard the document data stream.

11. The method of claim 9, wherein the action performed in the at least one consumer plug-in is to abort processing of the document data stream.

12. The method of claim 2, wherein making the modification to the document data stream comprises modifying at least one existing property in the document data stream by deleting the existing property from the document data stream and inserting a substitute property in the document data stream.

13. The method of claim 12, wherein the at least one consumer plug-in:
   receives the document data stream after at least one modification has been made to the document data stream by the at least one active plug-in; and
   performs an action in response to the modification made to the original document data stream by the at least one active plug-in.

14. The method of claim 13, wherein the action performed in the at least one consumer plug-in is to discard the document data stream.

15. The method of claim 13, wherein the action performed in the at least one consumer plug-in is to abort processing of the document data stream.

16. The method of claim 2, wherein making the modification to the document data stream comprises deleting at least some of the contents from the document data stream.

17. The method of claim 2, wherein there is a plurality of active plug-ins that have been plugged-in to the gathering project in a sequence, each of said plurality of active plug-ins receiving as an input the document data stream as modified by an immediately preceding active plug-in in the sequence.

18. The method of claim 17, wherein the at least one consumer plug-in:
receives the document data stream after at least one modification has been made to the document data stream by the at least one active plug-in; and
performs an action in response to the modification made to the original document data stream by the at least one active plug-in.

19. The method of claim 18, wherein the action performed in the at least one consumer plug-in is to discard the document data stream.

20. The method of claim 18, wherein the action performed in the at least one consumer plug-in is to abort processing of the document data stream.

21. The method of claim 1, wherein the at least one consumer plug-in:
receives the document data stream after at least one modification has been made to the document data stream by the at least one active plug-in; and
performs an action in response to the modification made to the original document data stream by the at least one active plug-in.

22. The method of claim 21, wherein the action performed in the at least one consumer plug-in is to discard the document data stream.

23. The method of claim 21, wherein the action performed in the at least one consumer plug-in is to abort processing of the document data stream.

24. The method of claim 1, wherein the parsing of the document is accomplished using a filtering process that creates the document data stream, the document data stream comprising a uniform representation of a set of contents and properties contained in the document.

25. The method of claim 24, wherein the filtering process deletes certain contents and properties from the document data stream before piping the document data stream to the active plug-in.

26. The method of claim 25, wherein the certain contents and properties comprise formatting information.

27. The method of claim 26, wherein the filtering process is external to the gatherer process.

28. A computer-based method for processing data retrieved during a crawl of a computer network, comprising:
retrieving a document with a gatherer process; and
parsing the document into a document data stream including contents and properties; and
piping the document data stream to at least one active plug-in, said active plug-in having the capability of modifying the document data stream by adding to, deleting from, or changing the content and/or properties of the document data stream; and
piping the document data stream to at least one consumer plug-in, said consumer plug-in having the ability to perform an action in response to the modification made by said active plug-in; and
not forwarding at least some of the document data stream to a subsequent plug-in based on the analysis performed by the active plug-in.

29. The method of claim 28, wherein the entire document data stream associated with the document is not forwarded to the subsequent plug-in.

30. The method of claim 28, wherein the subsequent plug-in is another active plug-in.

31. The method of claim 28, wherein the subsequent plug-in is a consumer plug-in.

32. The method of claim 28, wherein the parsing of the document is accomplished with a filtering process that creates the document data stream, the document data stream comprising a uniform representation of a set of contents and properties contained in the document.

33. The method of claim 32, wherein the filtering process deletes certain contents and properties from the document data stream before piping the document data stream to the active plug-in.

34. The method of claim 33, wherein the certain contents and properties comprise formatting information.

35. The method of claim 34, wherein the filtering process is external to the gatherer process.

36. A computer-readable medium having computer-executable instructions for retrieving and processing information from a computer network, wherein retrieving and processing information from a computer network includes performing a Web crawl, wherein performing a Web crawl comprises:
retrieving an electronic document copy from the computer network in a gathering project, the electronic document copy having text chunks and properties;
passing the electronic document copy to an active plug-in that analyzes the electronic document copy;
making at least one change to the electronic document copy with the active plug-in, wherein making the change comprises:
adding a property to the electronic document copy if the active plug-in determines that a property should be added;
deleting a property from the electronic document copy if the active plug-in determines that a property should be deleted;
modifying a property of the electronic document copy if the active plug-in determines that a property should be modified;
deleting a text chunk from the electronic document copy if the active plug-in determines that the text chunk should be deleted; and
passing the electronic document copy that has been changed by the active plug-in to a consumer plug-in that processes the electronic document copy responsive to the change made in the electronic document copy by the active plug-in.

37. The computer-readable medium of claim 36, wherein there is a plurality of active plug-ins that have been plugged-in to the gathering project in a sequence, each of said plurality of active plug-ins receiving as an input the electronic document copy including the change made by an immediately preceding active plug-in in the sequence.

38. The computer-readable medium of claim 36, wherein there is a plurality of consumer plug-ins that have been plugged-in to the gathering project, each of said plurality of consumer plug-ins receiving as an input the electronic document copy including the change made by the active plug-in.

39. The computer-readable medium of claim 36, wherein the active plug-in and the consumer plug-in are objects that are visible in a distributed namespace, wherein a distributed namespace is an area in a computer memory that associates an identifier for the object with a location in the computer memory, the distributed namespace being accessible by a plurality of computers that are networked into a distributed system.

40. A system for retrieving and processing information stored on a computer, the system comprising:

an information retrieval component that retrieves information from the computer;

at least one modular active plug-in component, each of the modular active plug-in components being associated with the information retrieval component in a sequence that defines the order that the information is passed to each of the at least one modular active plug-in components; and each of the at least one modular active plug-in components being capable of analyzing and modifying the information before passing the information to a next active plug-in component in the sequence.

41. The system of claim 40, further comprising:

at least one modular consumer plug-in component, each of the at least one modular consumer plug-in components being associated with the information retrieval component so that each of the at least one modular consumer plug-in components receives the information as it has been modified by each of the at least one active plug-in components.

42. The system of claim 41, wherein:

at least one of the at least one consumer plug-in components processes the information in a manner responsive to information that has been added by the at least one active plug-in component.

43. The system of claim 41, wherein:

at least one of the at least one consumer plug-in components processes the information in a manner responsive to information that has been deleted by the at least one active plug-in component.

44. The system of claim 41, wherein:

at least one of the at least one consumer plug-in components processes the information in a manner responsive to information that has been modified by the at least one active plug-in component.

45. A system for retrieving information from a computer network having a plurality of electronic documents stored thereon, wherein each electronic document corresponds to a corresponding document address specification that provides information for locating the electronic document, the system comprising:

means for retrieving a plurality of electronic documents, each electronic document having content comprising data and meta-tags;

first computer-executable instructions implemented as an active plug-in object for conducting an analysis of the content of each electronic document and means for modifying the meta-tags associated with each electronic document responsive to the analysis; and second computer-executable instructions implemented as a consumer plug-in object for processing each electronic document responsive to the meta-tags associated with each electronic document.

46. The system of claim 45, wherein:

the first executable instructions implemented as an active plug-in object may be modularly inserted and withdrawn from the means for retrieving a plurality of electronic documents.

47. The system of claim 46, wherein:

the second executable instructions implemented as a consumer plug-in object may be modularly inserted and withdrawn from the means for retrieving a plurality of electronic documents.

48. The system of claim 47, wherein:

there are a plurality of active plug-in objects that are a part of the means for retrieving a plurality of electronic documents.

49. The system of claim 48, wherein:

there are a plurality of consumer plug-in objects that are a part of the means for retrieving a plurality of electronic documents.

\* \* \* \* \*

UNITED STATES PATENT AND TRADEMARK OFFICE
CERTIFICATE OF CORRECTION

PATENT NO.   : 6,199,081 B1
DATED        : March 6, 2001
INVENTOR(S)  : D. Meyerzon et al.

It is certified that error appears in the above-identified patent and that said Letters Patent is hereby corrected as shown below:

Title page,
Item [56], References Cited, U.S PATENT DOCUMENTS, "Kirsch et al." should read -- Kirsch --

OTHER PUBLICATIONS, "Workd," should read -- Works, --; and "et al," should read -- et al., --

Column 1,
Line 23, "ail" should read -- Mail --
Line 36, "metadata" should read -- meta-data --

Column 2,
Line 16, "Word Wide Web." should read -- World Wide Web. --

Column 3,
Lines 45-48, delete second occurrence of "deleting properties from the document data stream,"
Line 58, delete "like it"

Column 4,
Line 22, "censoring of documents" should read -- censoring documents --
Line 27, "provides" should read -- provide --

Column 6,
Line 44, "that helps" should read -- that help --
Line 66, "(ROM," should read -- (ROM), --

Column 7,
Line 28, "FIGURE." should read -- FIG. 1. --

Column 9,
Line 52, "HTIP" should read -- HTTP --
Line 56, "another other" should read -- another --
Line 58, "specifications" should read -- specifications, --

UNITED STATES PATENT AND TRADEMARK OFFICE
CERTIFICATE OF CORRECTION

PATENT NO. : 6,199,081 B1
DATED : March 6, 2001
INVENTOR(S) : D. Meyerzon et al.

It is certified that error appears in the above-identified patent and that said Letters Patent is hereby corrected as shown below:

Column 10,
Line 31, "processes" should read -- process --
Line 49, "example on" should read -- example of --

Column 11,
Line 57, "CONIENTS" should read -- CONTENTS --

Column 12,
Line 11, "plug-in, with an" should read -- plug-in, or with an --
Line 21, "could be then be" should read -- could then be --

Column 13,
Line 3, "410 it" should read -- 410 --
Line 55, "effect" should read -- affect --

Column 14,
Line 23, "(OUR)" should read -- (OLE) --
Line 34, "Query interface" should read -- QueryInterface --
Line 62, "system the" should read -- system, the --
Line 62, "narespace" should read -- namespace --

Column 15,
Line 10, "IDatResource" should read -- IDataResource --

Column 16,
Line 24, "LIctiveFilterSink" should read -- IActiveFilterSink --

Column 17,
Lines 49 and 50, "Advis-
eStatusChange" should break as follows:
-- Ad-
viseStatusChange --

UNITED STATES PATENT AND TRADEMARK OFFICE
CERTIFICATE OF CORRECTION

PATENT NO. : 6,199,081 B1
DATED : March 6, 2001
INVENTOR(S) : D. Meyerzon et al.

It is certified that error appears in the above-identified patent and that said Letters Patent is hereby corrected as shown below:

<u>Column 19,</u>
Line 53, "process; and" should read -- process; --
Line 55, "properties; and" should read -- properties; --
Line 60, "stream; and" should read -- stream; --

Signed and Sealed this

Twenty-third Day of April, 2002

*Attest:*

*Attesting Officer*

JAMES E. ROGAN
*Director of the United States Patent and Trademark Office*